United States Patent [19]

Chao et al.

[11] Patent Number: 5,019,898

[45] Date of Patent: May 28, 1991

[54] REAL-TIME PSEUDOCOLOR DENSITY ENCODING OF AN IMAGE

[75] Inventors: Tien-Hsin Chao, Valencia; Hua-Kuang Liu, South Pasadena, both of Calif.

[73] Assignee: The California Institute of Technology, Pasadena, Calif.

[21] Appl. No.: 344,243

[22] Filed: Apr. 26, 1989

[51] Int. Cl.⁵ .............................................. H04N 13/00
[52] U.S. Cl. .......................................... 358/81; 358/89
[58] Field of Search ....................... 358/81, 89, 82, 75, 358/41; 355/32, 67

[56] References Cited

U.S. PATENT DOCUMENTS

| | | |
|---|---|---|
| 2,350,892 | 6/1944 | Hewson . |
| 2,527,593 | 10/1950 | Stadler . |
| 2,638,816 | 5/1953 | Holzer . |
| 2,807,799 | 9/1957 | Rosenthal ............................. 358/81 |
| 2,846,799 | 8/1958 | Viszlocky et al. . |
| 3,131,253 | 4/1964 | Zandman et al. . |
| 3,488,105 | 1/1970 | Snapper . |
| 3,501,219 | 3/1970 | Caulfied . |
| 3,711,180 | 1/1973 | Klinger et al. . |
| 4,080,046 | 3/1978 | Niglrizaki . |
| 4,374,397 | 2/1983 | Mir ........................................ 358/75 |
| 4,375,647 | 1/1983 | Mir ........................................ 358/75 |
| 4,461,542 | 7/1984 | Cagnon . |
| 4,623,245 | 11/1986 | Yu ...................................... 358/487 |
| 4,680,579 | 7/1987 | Ott ...................................... 358/89 |

Primary Examiner—Howard W. Britton
Assistant Examiner—Kim Yen Vu
Attorney, Agent, or Firm—Thomas N. Giaccherini

[57] ABSTRACT

A method and apparatus are disclosed for real-time optical broadband pseudocolor encoding of an image. A light polarization spatial modulator is utilized to density encode an incident beam of plane-polarized light; the beam is dispersed into its primary colors; the polarizations of the dispersed beams are analyzed to produce positive, negative, and bidirectionally modulated images which are each separately encoded with a primary color; and the primary-color encoded beams are combined to produce a pseudocolored image. In a preferred embodiment the pseudocolor encoding apparatus comprises a compact white-light projection system and a liquid-crystal television spatial light polarization modulator. The invention makes possible the large-screen display of broadband pseudocolor images from real-world input scenes from a television camera.

28 Claims, 6 Drawing Sheets

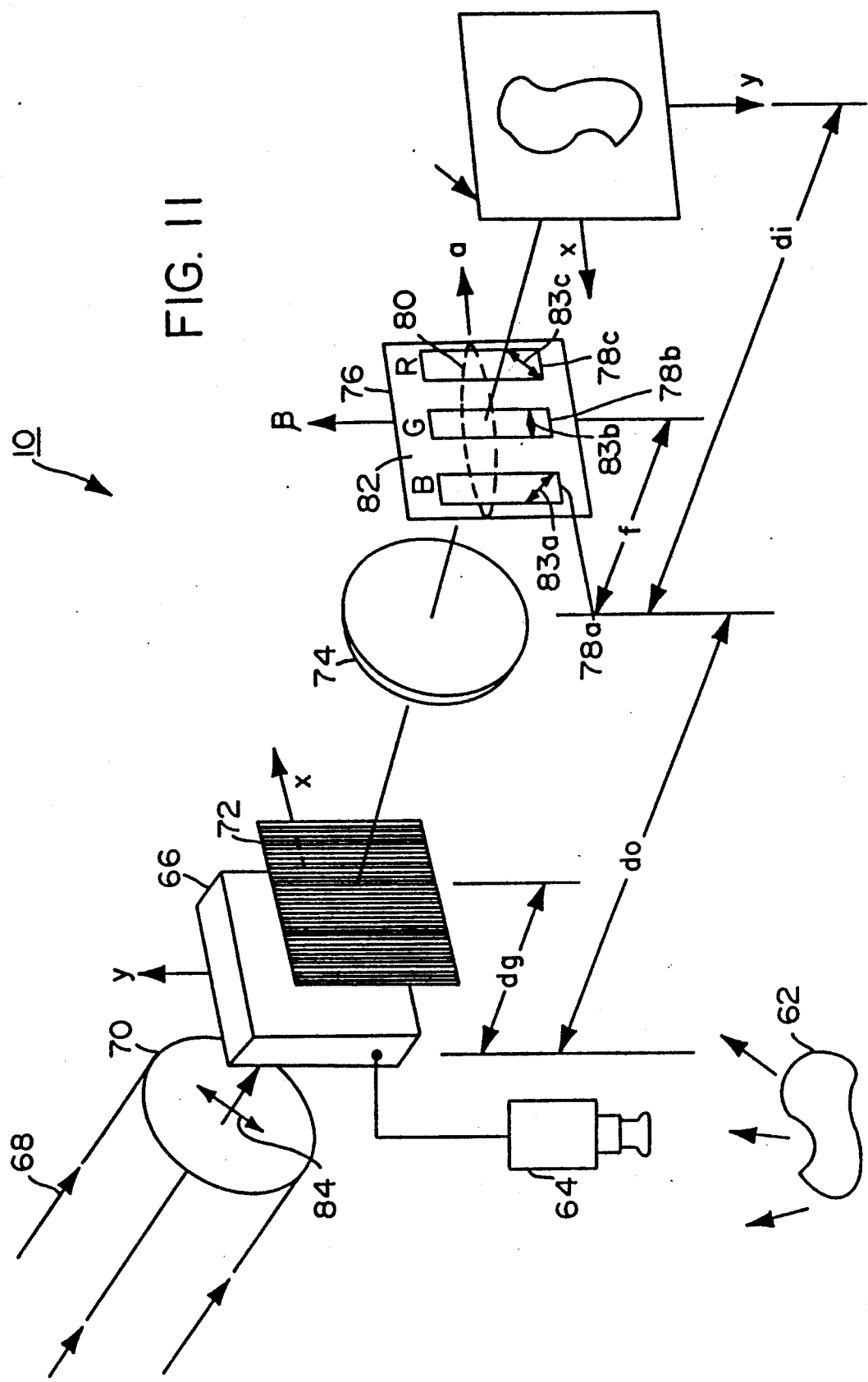

REAL-TIME PSEUDOCOLOR DENSITY ENCODING OF AN IMAGE

ORIGIN OF THE INVENTION

The invention described herein was made in the performance of work under a NASA contract, and is subject to the provisions of Public Law 96-517 (35 USC 202) in which the contractor has elected to retain title.

TECHNICAL FIELD

The invention relates generally to methods and apparatus for image enhancement, and in particular to methods and apparatus for real-time broadband pseudocolor density encoding of images.

BACKGROUND ART

The ranges of colors we perceive are the consequence of a mixture of light of different wavelengths. Certain wavelengths of blue, green, and red light, referred to as the "primary" colors, will produce a wider range of colors when combined with each other in varying intensities than any other three-color combination. Addition of two primary colors will produce the "secondary" colors cyan (green and blue), magenta (red and blue), and yellow (red and green). Mixture in the proper proportions of all three primary colors, or of a secondary color with its complementary primary color, gives white light.

The primary colors of light should be carefully distinguished from the primary colors of coloring agents or pigments. A primary pigment color absorbs and therefore substracts a primary color of light, and reflects or transmits the other two, since we see opaque objects by the light they reflect and transparent objects by the light they transmit. The primary pigment colors are the secondary light colors, and vice versa. Mixing the three pigment primaries in the correct combination will result in black, the total absorption of light.

A black-and-white image generally contains light and dark portions ranging from pure white to pure black, with intermediate intensity levels consisting of various shades of gray. The shades of gray or gray "levels" which make up such an image are processed by the human eye in a performance that can be characterized as relatively poor in comparison to the proficiency of the human eye in dealing with color. At a given point in an image the average observer can only differentiate about one to two dozen gray levels, whereas the same observer can discern thousands of variations in color. This far superior ability of the eye to discriminate subtle details of color images as opposed to black-and-white images has led to the development of image processing techniques that provide a black-and-white image with pseudocolors.

In pseudocolor techniques the processing starts with a monochrome image. Each small portion of the image, known as a "pixel," receives a color according to some scheme. Pseudocolor encoding assigns a color to each pixel based on some varying property of the image, and in so-called pseudocolor density encoding the property is the brightness of the image at the location of the pixel.

The use of pseudocolored images has found wide application, largely in the form of computer processed images. Pseudocoloring methods have typically been utilized in mapping analysis by NASA of the earth and other planets by earth satellites and space probes, in military intelligence studies of satellite reconnaissance pictures, in earth resources surveys, in medical diagnosis by internal bodily imaging methods, and in industrial inspection applications such as for defective parts in automated production.

There is a relatively small number of pseudocolorization methods which do not depend on computer processing. In one method, a halftone-encoded image transparency is illuminated by two superimposed laser beams of different wavelengths; this method is described in the article by H. K. Liu and J. W. Goodman entitled "A new coherent optical pseudocolor encoder," in the journal Nouvelles Revues Optique, volume 7, page 285, published in 1976. In another method, a halftone-encoded image transparency is illuminated by a collimated white-light beam, as described in the article by A. Tai et al. entitled "White light pseudocolor density encoder," in the journal Optics Letters, volume 3, page 190, published in 1978. By selective spatial filtering of the different color components contained in the various diffraction orders in the Fourier plane, a pseudocolor density encoded image can be obtained in the output plane.

Pseudocolor encoding can also be achieved with grating encodings, as described in the article by T. H. Chao et al. entitled "White light pseudocolor density encoding through contrast reversal," in the journal Optics Letters, volume 5, page 230, published in 1980; in the article by J. A. Mendez and J. Bescos entitled "Gray level pseudocoloring with three primary colors by a diffraction grating modulation method," in the Journal of Optics, volume 14, page 69, published in 1983; and in the article by F. T. S. Yu et al. entitled "White light pseudocolor encoding with three primary colors," in the Journal of Optics, volume 15, page 55, published in 1984. In these methods, a positive (original) image, a negative image, and a product of the two are sequentially contact printed through a grating onto black-and-white photographic film. The orientation of the grating varies with each exposure. For retrieval of the pseudocolor image, the encoded image transparency is illuminated with a white light plane wave. After color spatial filtering at the Fourier plane, each of three encoded image components passes through a primary color primary filter.

Although a broad band of pseudocolor can be obtained satisfactorily in the output plane by these encoding techniques, the fact that they are not real-time techniques has severely limited their applications. A real-time technique is one that can be carried out in so-called real time, without any delay required for processing. Photographic or computer-based methods necessarily involve some interval of delay to produce the pseudocolored image, and for certain applications any delay is unacceptable.

Several real-time density-encoding pseudocoloring methods have been reported. One technique utilizes a contrast-reversal spatial filter to obtain a negative image. This negative image is carried by a laser beam of one wavelength and superimposed with a positive image of a different wavelength. The mixture of these two images generates a color-coded image in real time. The technique is described in the article by J. Santamaria et al. entitled "White light pseudocolor density encoding through contrast reversal," in the journal Optics Letters, volume 10, page 151, published in 1979.

Pseudocolor encoding can also be achieved by a method based on the scattering properties of photographic film, as described in the article by J. A. Mendez and M. Nieto-Vesperinas entitled "Light scattering by film grain noise: application to gray level optical pseudocoloring," in Applied Optics, volume 22, page 2068, published in 1983. A positive, a negative, and a bidirectionally modulated image can be obtained simultaneously by illuminating an original image transparency with oblique transmission and diffuse reflection. Coding each of the three images with a primary color and superposing them produces a pseudocolor image.

Pseudocoloring has also been obtained directly by using the birefringent effect of a liquid crystal light valve spatial light modulator (LCLV SLM). Since the LCLV is biased at a specific frequency and voltage and is read out with a white light beam, the output image is automatically color coded. A similar effect has been reported with an LCTV SLM in the article by F. T. S. Yu et al. entitled "Real-time pseudocolor encoding using a low-cost liquid crystal television," in the journal Optical Laser Technology, volume 19, page 45, published in 1987.

STATEMENT OF THE INVENTION

In accordance with the invention, a method for pseudocolor density encoding of an image comprises providing a beam of linearly polarized white light with an axis of linear polarization; encoding the beam with the image by spatially modulating the polarized white light beam by spatially altering the polarization in accordance with the spatial distribution of intensities in the image with a spatial light polarization modulation (SLPM) means disposed in a path of the light beam; dispersing the spatially modulated white light beam with a light dispersion means disposed in a path of the beam following the SLPM means into a dispersed beam with spatially separated component colors; converging a spatially modulated beam from the SLPM means with a light converging means onto a focal surface thereof to produce a converged spatially modulated beam; analyzing a first portion of light of a first primary color in the converged spatially modulated beam with a first polarization analyzer means disposed in the back focal plane; analyzing a second portion of light of a second primary color in the converged spatially modulated beam with a second polarization analyzer means disposed in the back focal plane; analyzing a third portion of light of a third primary color in the converged spatially modulated beam with a third polarization analyzer means disposed in the back focal plane; blocking those portions of the dispersed beam not passing through the first, second, and third analyzer means with a masking means; and superposing the first, second, and third portions of the dispersed beam on a screen to form an enlarged pseudocolored version of the image.

An apparatus in accordance with the invention for pseudocolor density encoding of an image comprises source means for providing a beam of linearly polarized white light with an axis of linear polarization; spatial light polarization modulation (SLPM) means for spatially modulating the polarized white light beam by spatially altering the polarization of the beam in accordance with the spatial distribution of intensities in the image, disposed in a path of the light beam to produce an output beam which is spatially modulated by having varying degrees of rotation of the axis of linear polarization at different locations in the beam; converging means for converging a parallel beam of light incident thereon onto a focal plane; dispersion means disposed between the SLPM means and the converging means, for dispersing the spatially modulated white-light beam into a dispersed beam with spatially separated component colors; first, second, and third polarization analyzer means for analyzing light incident thereon, each disposed in the focal plane at a different primary color region and each having a linear axis associated therewith oriented at a different angle with respect to the axis of linear polarization of the beam incident on the SLPM means; and masking means for blocking all portions of the dispersed beam except first, second, and third portions passing through the first, second, and third analyzer means, respectively. The first, second, and third portions of the beam can be combined to form an enlarged pseudocolored version of the image.

BRIEF DESCRIPTION OF THE DRAWINGS

The various features and advantages of the present invention are apparent in light of the following detailed description taken together with the accompanying drawings, in which:

FIG. 11 is a schematic diagram of the real-time optical broadband pseudocolor encoding apparatus of the invention;

DETAILED DESCRIPTION OF THE INVENTION

Figure 1:
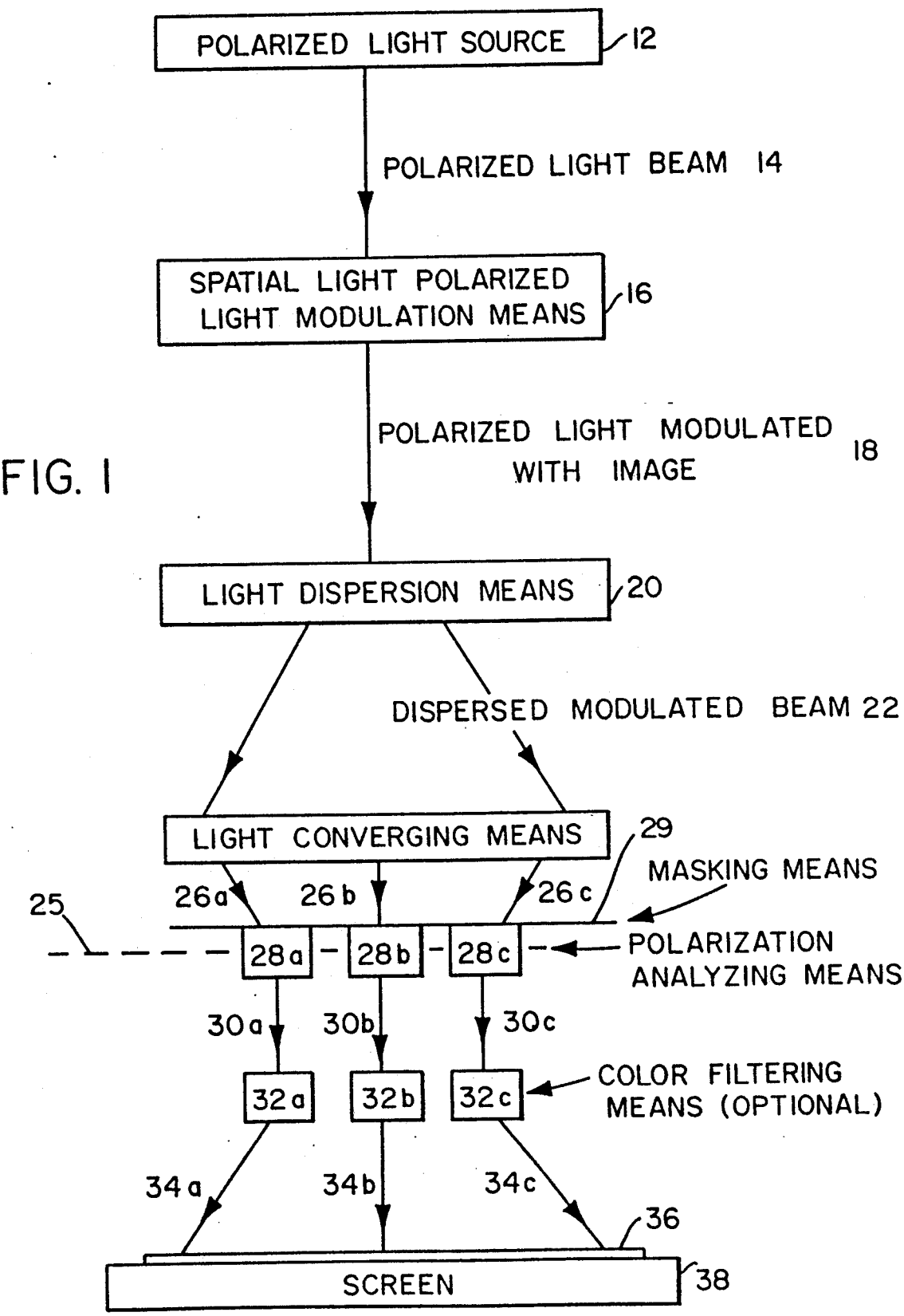
FIG. 1 is a schematic block diagram illustrating the method and apparatus for real-time pseudocolor density encoding of an image of the present invention.

FIG. 1 is a schematic block diagram illustrating the method and apparatus 10 of the present invention for real-time pseudocolor density encoding of an image. A source of polarized white light 12 produces a polarized white light beam 14 which is applied to a spatial light polarization modulation (SLPM) means 16. SLPM means 16 is any device or combination of devices which will spatially modulate the polarization of a white light beam according to the intensity distribution of a desired image. The output of SLPM means 16 is a white light beam 18 with a spatial distribution of polarization which carries information about the spatial intensity distribution of the image applied to means 16. Beam 18 is incident on a dispersion means 20 which disperses beam 18 into a dispersed polarization-modulated beam 22 in which the component colors are spatially separable. Dispersed beam 22 is incident on a converging means 24 characterized by a focal surface 25 onto which the dispersed beam 22 is focused. Portions 26a, 26b, and 26c of dispersed beam 22 represent those parts of white light beam 22 corresponding to the primary-color regions. Portion 26a might be red light, 26b green light, and 26c blue light, for example. First, second, and third polarization analyzing means 28a, 28b, and 28c are disposed on focal surface 25 at positions where portions 26a, 26b, and 26c, respectively, of dispersed beam 22 are focused. A masking means 29 blocks any light which is not incident on the three analyzing means 28. Each analyzing means 28 is oriented in such a way that the light 30 of a given primary color that has passed through the analyzing means carries the image modulated in a different way than the other two dispersed beams. Combination of the three color encoded beams 30a, 30b, and 30c produces an enlarged pseudocolored image 36 on a screen 38. First, second, and third color filtering means 32a, 32b, and 32c may be employed to filter the beams 30a, 30b, and 30c to produce filtered beams 34a, 34b, and 34c. In this way the quality of the pseudocolored image 36 produced by combining beams 34a, 34b, and 34c can be further controlled.

The polarization properties of liquid-crystal television cells can be used to perform the required spatial light modulation in the present invention. Since its introduction in 1985, the liquid-crystal television (LCTV) has been adopted as an inexpensive electronically addressed spatial light modulator (SLM), as described in the article by H. K. Liu et al. entitled "Optical-data-processing properties of a liquid-crystal television spatial light modulator," in the journal Optics Letters, volume 10, page 635, published in 1985.

Figure 2:
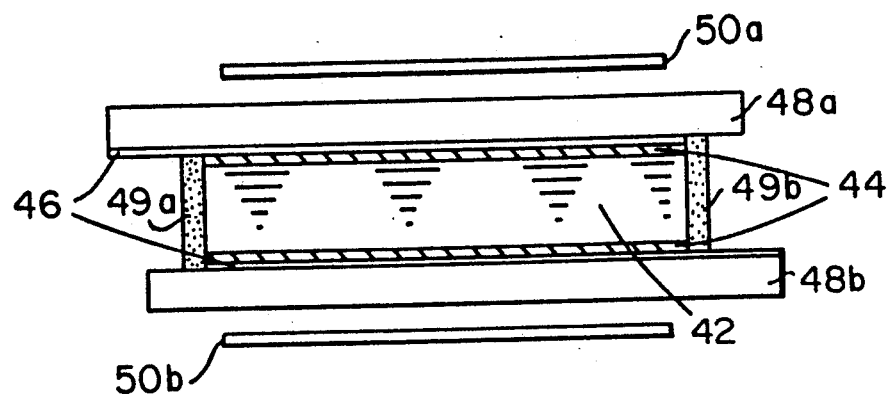
FIG. 2 is an end view of one cell in a spatial light modulator (SLM) employing twisted nematic crystals to modulate the polarization of incident light.
Figure 3:
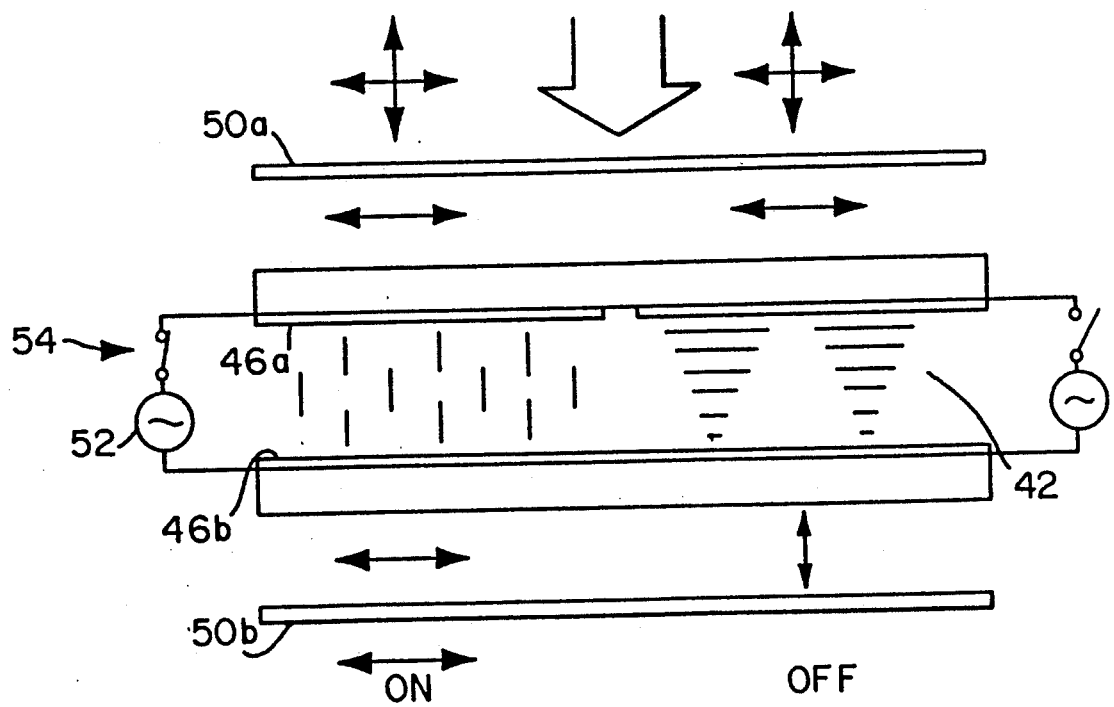
FIG. 3 is a schematic end view of the same kind of spatial light modulator as in FIG. 2, showing two cells with an applied electric field.

The screen of an LCTV consists of a large array of liquid-crystal cells. One such cell 40 is depicted in an end view in FIG. 2. Twisted nematic liquid crystals 42 are sealed between two glass anchoring plates 44a and 44b. Transparent electrodes 46a and 46b are on a second pair of glass plates 48a and 48b spaced apart by spacers 49a and 49b. The cell 40 is sandwiched between polarizers 50a and 50b having their axes of polarization oriented parallel to each other. As shown in FIG. 3, when no electric field is applied across the electrodes 46a and 46b, the twisted nematic crystals 42 rotate the axis of polarization of incoming light beams by 90 degrees. The output analyzer 50b, whose polarization axis is orthogonal, will block the light beams, and the "off" state results. When a sufficiently intense electric field is applied to the electrodes 46a and 46b by voltage source 52 through the closure of switch 54, the orientation of the liquid crystal 42 is twisted back and no change is made to the polarization state of the incoming light beam. The light beam is able to pass through, and the "on" state results. A gray-scale distribution of an image contained in the beam after it passes through polarizer 50b can be varied as a function of the orientation of polarizer 50b. An LCTV is thus a gray-scale modulation device. Since input scenes are fed into the LCTV through a TV camera or a computer, the array of liquid-crystal cells is addressed in a raster scanning mode.

Figure 4:
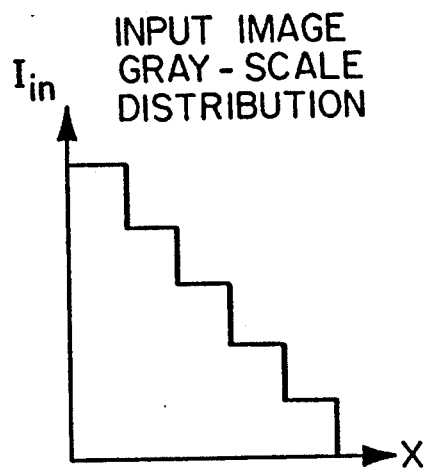
FIG. 4 is a graph of the gray-scale distribution of the input image.

In accordance with the invention three different gray-scale modulation methods are described for an input beam carrying an image with a gray-scale distribution as shown in FIG. 4, in which beam intensity is plotted against position x in the beam. First, as shown by the diagram of polarization axes in FIG. 5, the polarization axis 56 of the linearly polarized input light beam is rotated by an angle $\Omega$ from its "off" state as it passes through the liquid crystal layer 42. The rotation angle $\Omega$ increases as a function of the increase in the applied electric field intensity, which is proportional to the input image intensity. When the axis 58 of the output polarization analyzer 50b is oriented perpendicular to the "off" polarization state, by Malus's law the light amplitude transmittance $t_p$ of the output image is $$t_p = K \sin \Omega, \quad 0 < \Omega < \Omega_{max}, \tag{1}$$

where K is a proportionality constant and $\Omega_{max}$ is the maximum value of the angle $\Omega$. It can be seen from Equation (1) that in general, the input is nonlinearly proportional to the output; however, if $\Omega_{max}$ is small, the output light amplitude transmittance is linearly proportional to the input light amplitude transmittance. For convenience, the case of small $\Omega_{max}$ is plotted in FIG. 6. The output image $I_{01}$ is linearly proportional to the stepped input gray-level pattern Iin.

Figure 8:
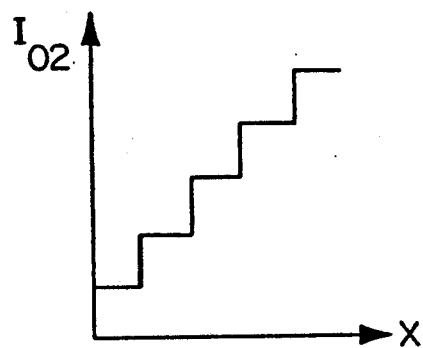
FIG. 8 is a graph of the gray-scale distribution of the negative output image from the second polarization analyzer.
Figure 7:
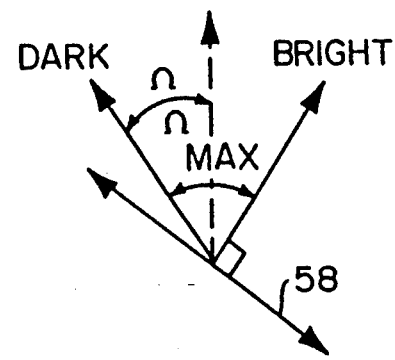
FIG. 7 is a schematic diagram of the orientation of the second polarization analyzer with respect to the direction of polarization of the light beam incident on the SLM.

Second, a contrast-reversed image of an input scene can be obtained as shown in FIG. 8. In this case, as shown in FIG. 7, the orientation 58 of the polarization analyzer is perpendicular to the maximum rotational angle of the liquid crystal (i.e., at $\Omega = \Omega_{max}$). The light amplitude transmittance of the output image is $$t_n = K \sin (\Omega_{max} - \Omega), \quad 0 < \Omega < \Omega_{max}. \tag{2}$$

Equation (2) shows that the output light amplitude distribution is inversely proportional to the input light amplitude distribution. As shown in the graph of FIG. 8, the output image $I_{02}$ is a contrast-reversed version of the input image $I_{in}$.

Figure 10:
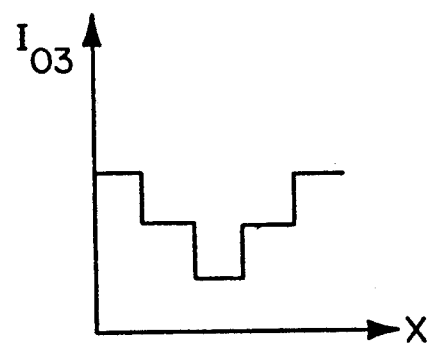
FIG. 10 is a graph of the gray-scale distribution of the bi-directionally modulated output image from the third polarization analyzer.
Figure 9:
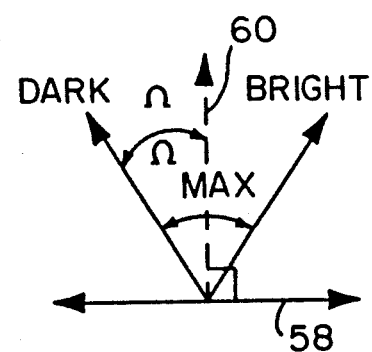
FIG. 9 is a schematic diagram of the orientation of the third polarization analyzer with respect to the direction of polarization of the light beam incident on the SLM.

Third, a bidirectional modulation technique is utilized for gray-scale modulation. Additional information about the technique is contained in the article by D. Psaltis et al. entitled "Optical image correlation with a binary spatial light modulator," in the journal Optical Engineering, volume 23, number 6, pages 698-704, published in 1984. As shown in FIG. 9, when the orientation 58 of the polarization analyzer is perpendicular to the bisector 60 of the two extreme polarization states at $\Omega = 0$ and $\Omega = \Omega_{max}$, the intensity transmittance of the output image becomes $$t_{bi} = K' \sin (\Omega - \Omega_{max}/2), \quad 0 < \Omega < \Omega_{max}, \tag{3}$$

where K' is a proportionality constant. Equation (3) indicates that by using the bidirectional modualation scheme, we transform the middle point of the input gray scale to the minimum gray level in the output. The highest and lowest levels of the input are transformed to the same highest level in the output. This is illustrated in the graph of FIG. 10.

Figure 6:
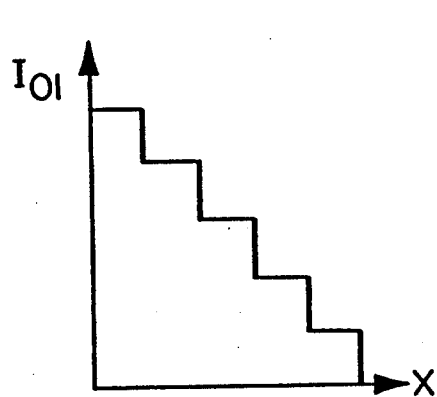
FIG. 6 is a graph of the gray-scale distribution of the positive output image from the first polarization analyzer.

In FIG. 6, the linear relationship between the input and output stepped gray-level pattern is true only when the input gray-scales fall in the linear region of the transfer characteristic curve of the LCTV spatial light modulator. Nonlinearity occurs at the toe and shoulder areas of the measured transfer characteristic curves shown in FIG. 12.

Based on the three schemes of modulating the gray-scale distribution of an input scene through an LCTV spatial light modulator as just described, a pseudocolor density encoding method in accordance with the invention comprises separately encoding each of the positive, negative, and bidirectionally modulated images with one of the primary colors and then superposing them to obtain a broadband pseudocolored image.

Figure 5:
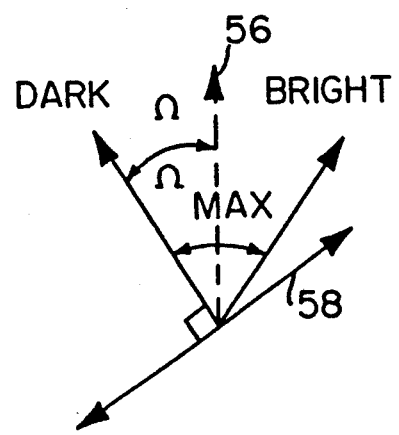
FIG. 5 is a schematic diagram of the orientation of the first polarization analyzer with respect to the direction of polarization of the light beam incident on the SLM.

FIG. 11 is a schematic diagram of one arrangement of a pseudocolor encoding apparatus 10 in accordance with the invention. A real-world scene 62 is picked up by a TV camera 64 and fed into an LCTV spatial light modulator 66. A collimated white-light beam 68 is used to illuminate the screen of LCTV 66 through a polarizer 70. Both the polarizer and analyzer that would normally enclose the LCTV 66 screen are replaced in apparatus 10 by separately rotatable polarizers. A phase diffraction grating 72 is placed at a short distance $d_g$ behind the LCTV 66 screen. A projection lens 74 is used to image the input image to an output plane with a magnification. At the back focal plane 76 of lens 74, a set three polarization analyzers 78a, 78b, and 78c is inserted immediately behind the dispersed image spectrum 80. The first polarization analyzer 78a is placed behind the region of the green color area, the second polarization analyzer 78b is placed behind the region of the blue color area, and the third polarization analyzer 78c is placed behind the region of the red color area. The remainder of the image spectrum is blocked with an opaque mask 82. To perform pseudocolor encoding, the orientations of polarization analyzers 78a, 78b, and 78c with respect to the polarization axis 84 of the impinging white-light beam are arranged as shown in FIGS. 5, 7, and 9.

If the input scene amplitude distribution is t(x,y), its corresponding wavelength-dispersed Fourier spectrum $E(\alpha,\beta)$ at the back focal plane 76 behind the analyzers 78 is given by $$E(\alpha,\beta) = C \ [T_{pg}(\alpha/\lambda_g f, \beta/\lambda_g f) * \delta(\beta - \lambda_g fa) \qquad (4)$$
$$T_{nb}(\alpha/\lambda_b f, \beta/\lambda_b f) * \delta(\beta - \lambda_b fa)$$
$$T_{bir}(\alpha/\lambda_r f, \beta/\lambda_r f) * \delta(\beta - \lambda_r fa),$$

where $T_{pg}$, $T_{nb}$, and $T_{bir}$ represent the positive image Fourier spectrum in green, the negative in blue, and the bidirectionally modulated in red; $\lambda_g$, $\lambda_b$, and $\lambda_r$ are the wavelengths of the green, blue, and red light, respectively; f is the focal length of projection lens 74; a is a constant proportional to the spatial frequency of grating 72; C is a complex constant; and the asterisk denotes the convolution operation.

At the output plane, the light intensity distribution may be written as $$I_o(x,y) = \{K_g[(t_{pg}/m)(x/M, y/M)]^2 + \qquad (5)$$
$$K_b[(t_{nb}/m)(x/M, y/M)]^2 +$$
$$K_r[(t_{bir}/m)(x/M, y/M)]^2,$$

where $t_{pg}$ is the positive image in green, $t_{nb}$ is the negative image in blue, and $t_{bir}$ is the bidirectionally modulated image in red. $K_g$, $K_b$, and $K_r$ are proportionally constants and $M=d_o/d_i$ is the magnification of the projection system. Equation (5) shows that the output image is a superposition of the red, green, and blue of the input image. Each has been gray-scale modulated and thus pseudocoloring is achieved.

Laboratory results have demonstrated the feasibility of the real-time pseudocoloring method of the invention. An EPSON LCTV model ET-10 was used as the spatial light polarization modulation (SLPM) means 16. This liquid-crystal television screen contains 220×240 cells. Each contains a thin-film transistor that is able to lock up the rotation angle of the liquid-crystal after each scanning. Because of the use of the thin-film transistor, the resultant contrast ratio is much higher than that of the Radio Shack model described in the article by H. K. Liu et al. entitled "Optical-data-processing properties of a liquid-crystal television spatial light modulator," in the journal Optics Letters, volume 10, page 635, published in 1985. However, since the EPSON LCTV is a color TV, it was addressed with a black-and-white charge-coupled device (CCD) television camera to avoid mixing up the pseudocolor with real color. A 75-Watt xenon arc lamp was used as a source of white light. For the grating 72 a dichromated gelatin phase grating was used, placed about 1 cm behind the LCTV 66 screen to avoid imaging any defects located on the surface of the grating onto the output plane. Imaging lens 74 was an f/1.8 achromat. Three steps were taken in the preparation of the polarizer filters for pseudocolor encoding. First, a polarizer 78a was placed at the Fourier plane over the green spectral band with its polarization axis oriented parallel to that of the input polarizer. A positive green output image similar to that of the input object was obtained at the output plane. A second polarization analyzer 78b was then placed over the area of the blue spectral band with its polarization axis rotated about 50 degrees away from the axis of the first polarizer 78a. Second polarizer 78b generated a contrast-reversed blue image at the output plane. Finally, a third polarizer 78c was placed over the red spectral band with its polarization axis oriented between those of the first and second polarizers 78a and 78b (about 25 degrees away from the axis of first polarizer 78a). The third polarizer 78c produced a red bidirectionally modulated image of the input scene. The simultaneous use of the three encoding polarizers 78a, 78b, and 78c results in a broadband pseudocolor image of a gray-scale input image. With an appropriate magnification, the output can be displayed on a large diffuse screen.

Figure 12:
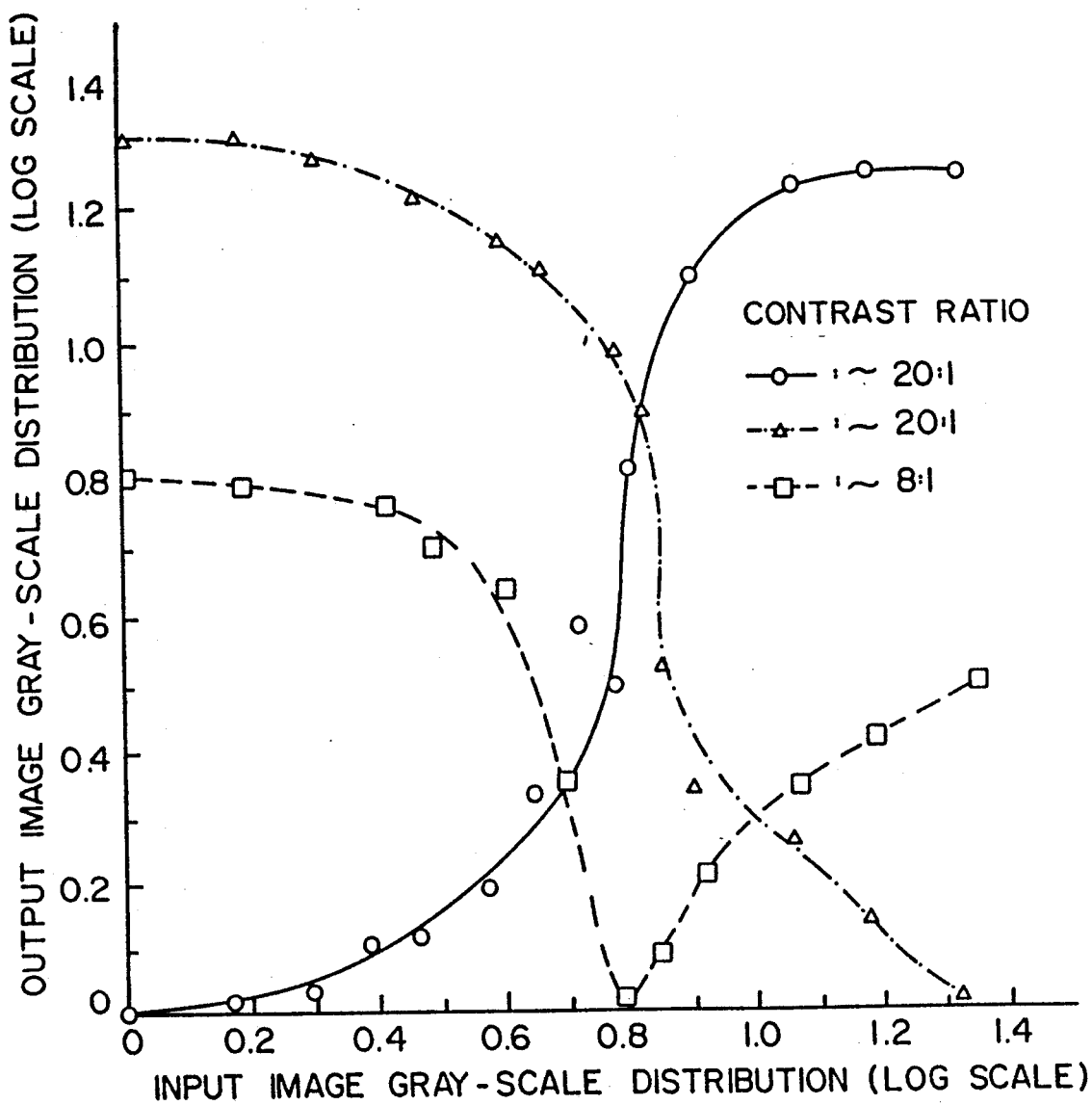
FIG. 12 is a log-log plot of output image gray-scale distribution versus input image gray-scale distribution as a function of analyzer orientation, measured from an EPSON model ET-10 liquid-crystal television spatial light modulator.

First, the effectiveness of the three gray-scale modulation schemes was tested by using a photographic gray-scale test pattern as the input object. A positive image of the test pattern was recorded from the green spectral band of the optical encoder. A negative image of the input object was obtained from the blue spectral band. A bidirectionally modulated image of the input object was obtained from the red spectral band. The intermediate and darkest gray levels in the positive image were transformed respectively into the darkest and brightest gray levels in the bidirectionally modulated image. The brightest gray level in the positive image remained the same in the bidirectionally modulated image. A color photograph of the resultant pseudocolor encoded image made by superimposing the three primary color image showed the brightest gray level mapped into green, the darkest gray level mapped into purple, and intermediate gray levels mapped into a broad band of color ranging from orange through yellow to yellow-green. FIG. 12 shows a plot of the measured output image gray-level distribution versus the input pattern gray-level distribution. From FIG. 12 it can be found that the output image contrast ratios of the positive and of the negative images were both about 20 to 1. The contrast ratio of the bidirectionally modulated image was only about 8 to 1.

In another demonstration, a golf ball was selected as the input object and illuminated by a photo lamp from its right rear side. The slowly varying curvature of the ball generated an image containing a wide range of gray levels. The pseudocolor encoded picture contained five vivid colors that outlined the contours of five slices of gray levels over the surface of the golf ball. The capability of the pseudocolor encoding apparatus 10 of the invention in encoding images of real-world input in real time has been amply demonstrated.

The invention also encompasses the use of other types of spatial light polarization modulators such as the liquid-crystal light valve (see the article by W. H. Bleha entitled "Progress in liquid crystal light valves," in the magazine Laser Focus, pages 111-120, published in October of 1983), the SIGHT magneto-optic device (MOD), and a microchannel plate SLPM instead of the liquid-crystal TV spatial light modulator. The liquid-crystal TV spatial light modulator has the advantages of being electronically addressable as well as having a low cost. With a large-screen display, the pseudocolor encoding method of the invention can be used in many industrial applications such as multicolor display, thermal image enhancement, and medical imaging enhancement.

The above-described embodiments are furnished as illustrative of the principles of the invention, and are not intended to define the only embodiments possible in accordance with our teaching. Rather, the invention is to be considered as encompassing not only the specific embodiments shown, but also any others falling within the scope of the following claims.

What is claimed is:

1. An apparatus for pseudocolor density encoding of an image in real time, comprising:
    spatial light polarization modulation (SLPM) means to which said image is applied;
    source means for providing a beam of polarized white light incident on said spatial light polarization modulation (SLPM) means;
    converging means for converging a beam of light incident thereon onto a focal surface;
    light dispersion means disposed between said spatial light polarization modulation (SLPM) means and said converging means, for dispersing a white-light beam emerging from said spatial light polarization modulation (SLPM) means into a dispersed beam of component colors;
    a plurality of polarization analyzer means for analyzing the polarization of light incident thereon, disposed on said focal surface in different regions of said dispersed beam corresponding to different component colors, each said analyzer means having a different orientation with respect to said beam of polarized white light; and
    masking means for allowing said dispersed beam to pass only through said plurality of analyzer means; wherein a plurality of analyzed beams passing through said plurality of analyzers can be superimposed to form a pseudocolored version of said image.

2. The apparatus of claim 1 further comprising a plurality of filtering means, wherein each of said filtering means comprises means for filtering out all wavelengths of light except those in a range of wavelengths narrower than the range corresponding to a particular component color, and wherein each said filtering means is disposed in a path of said dispersed beam following the particular one of said plurality of polarization analyzer means corresponding to the same component color.

3. The apparatus of claim 1 wherein said source means comprises a linearly polarized white light source and said spatial light polarization modulation (SLPM) means comprises a liquid-crystal TV screen.

4. The apparatus of claim 1 wherein said source means comprises a linearly polarized white light source and said spatial light polarization modulation (SLPM) means comprises a liquid-crystal light valve.

5. The apparatus of claim 1 wherein said source means comprises a linearly polarized white light source and said spatial light polarization modulation (SLPM) means comprises a microchannel plate.

6. The apparatus of claim 1 wherein said source means comprises a linearly polarized white light source and said spatial light polarization modulation (SLPM) means comprises a SIGHT magneto-optic device.

7. The apparatus of claim 1 wherein said plurality is three, and each said analyzer means is disposed in a region of said dispersed beam corresponding to a different primary color.

8. The apparatus of claim 7 wherein each said analyzer is a linear polarizer and the angles between the axis of polarization of said white light beam incident on said SLPM means and the axes of linear polarization of said polarizers are zero, an angle between zero and 90 degrees, and an angle intermediate between zero and said angle between zero and 90 degrees.

9. The apparatus of claim 8 wherein said angles are zero, 50 degrees, and 25 degrees.

10. The apparatus of claim 1 wherein said plurality is two, and each said analyzer means is disposed in a region of said dispersed beam corresponding to a different primary color.

11. The apparatus of claim 10 wherein each said analyzer is a linear polarizer and the angles between the axis of polarization of said white light beam incident on said SLPM means and the axes of linear polarization of said polarizers are zero and an angle between zero and 90 degrees.

12. An apparatus for pseudocolor density encoding of an image, comprising:
    source means for providing a beam of linearly polarized white light with an axis of linear polarization
    spatial light polarization modulation (SLPM) means for spatially modulating said polarized white light beam by spatially altering the polarization of said beam in accordance with the spatial distribution of intensities in said image, disposed in a path of said light beam to produce an output beam which is spatially modulated by having varying degrees of rotation of said axis of linear polarization at different locations in said beam;
    converging means for converging a parallel beam of light incident thereon onto a focal plane;

dispersion means disposed between said SLPM means and said converging means, for dispersing said spatially modulated white-light beam into a dispersed beam with spatially separated component colors;

first polarization analyzer means for analyzing light incident thereon, having a linear axis associated therewith oriented at a first angle with respect to said axis of linear polarization of said beam incident on said SLPM means, disposed in said focal plane;

second polarization analyzer means for analyzing light incident thereon, having a linear axis associated therewith oriented at a second angle with respect to said axis of linear polarization of said beam incident on said SLPM means, disposed in said focal plane adjacent said first polarization analyzer means;

third polarization analyzer means for analyzing light incident thereon, having a linear axis associated therewith oriented at a third angle with respect to said axis of linear polarization of said beam incident on said SLPM means, disposed in said focal plane adjacent said second polarization analyzer means; and masking means for blocking all portions of said dispersed beam except first, second, and third portions passing through said first, second, and third analyzer means, respectively;

wherein said first, second, and third portions of said beam can be combined to form an enlarged pseudocolored version of said image.

13. The apparatus of claim 1 further comprising:

first color filtering means for filtering out all spectral colors except a first color, disposed in a path of said dispersed beam after said first polarization analyzer means to produce a first filtered portion of an output beam carrying said image density-encoded in pseudocolor;

second color filtering means for filtering out all spectral colors except a second color, disposed in a path of said dispersed beam after said second polarization analyzer means to produce a second filtered portion of said output beam carrying said image density-encoded in pseudocolor; and third color filtering means for filtering out all spectral colors except a third color, disposed in a path of said dispersed beam after said third polarization analyzer means to produce a third filtered portion of said output beam carrying said image density-encoded in pseudocolor;

wherein said first, second, and third filtered portions of said beam can be combined to form an enlarged pseudocolored version of said image.

14. The apparatus of claim 13 wherein said first color filtering means is a red filter, said second color filtering means is a green filter, and said third color filtering means is a blue filter.

15. The apparatus of claim 13 wherein said first color filtering means is a blue filter, said second color filtering means is a green filter, and said third color filtering means is a red filter.

16. The apparatus of claim 12, wherein said spatial light polarization modulation (SLPM) means comprises a liquid-crystal TV screen.

17. The apparatus of claim 12, wherein said spatial light polarization modulation (SLPM) means comprises a liquid-crystal light valve.

18. The apparatus of claim 12, wherein said spatial light polarization modulation (SLPM) means comprises a microchannel plate.

19. The apparatus of claim 12, wherein said spatial light polarization modulation (SLPM) means comprises a SIGHT magneto-optic device.

20. The apparatus of claim 12 wherein said linear axes of said polarization analyzer means form angles with respect to said axis of polarization of said linearly polarized white light beam of zero degrees, an angle between zero and 90 degrees, and an angle intermediate between zero and said angle between zero and 90 degrees.

21. The apparatus of claim 12 wherein said source means comprises a randomly polarized source of white light emitting a beam which passes through a polarization means for linearly polarizing said beam.

22. The apparatus of claim 12 further comprising projection screen means for displaying an enlarged pseudocolored version of said image thereon.

23. The apparatus of claim 12 wherein said light dispersion means is a volume phase grating.

24. The apparatus of claim 12 wherein said light converging means is an achromatic projection lens.

25. A method for pseudocolor density encoding of an image in real time, comprising:

providing a beam of linearly polarized white light;

disposing in a path of said beam a spatial light polarization modulation (SLPM) means for spatially modulating said polarized white light beam with said image;

spatially altering the polarization of said beam with said SLPM means in accordance with the spatial distribution of gray-scale levels in said image, to produce a spatially modulated white-light beam;

dispersing with a light dispersion means said spatially modulated white-light beam from said SLPM means into a dispersed beam of spatially separated component colors;

converging with a converging means said dispersed beam of spatially-modulated light emerging from said dispersing means onto a focal surface characteristic of said converging means;

allowing said dispersed beam of light to pass only through a plurality of polarization analyzer means, each having a linear axis associated therewith, disposed on said focal surface in different regions of said dispersed beam, each said analyzer means having a different orientation with respect to said beam of polarized white light; and analyzing the polarization of said dispersed beam of spatially-modulated light with said plurality of polarization analyzer means to form an output beam carrying a pseudocolored version of said image.

26. A method for pseudocolor density encoding of an image, comprising:

providing a beam of linearly polarized white light;

disposing in a path of said beam a spatial light polarization modulation (SLPM) means for spatially modulating said polarized white light beam with said image;

spatially altering the polarization of said beam with said SLPM means in accordance with the spatial distribution of gray-scale levels in said image, to produce a spatially modulated white-light beam;

dispersing with a light dispersion means said spatially modulated white-light beam from said SLPM means into a dispersed beam of spatially separated component colors;

converging with a converging means said dispersed beam of spatially-modulated light emerging from said dispersing means onto a focal surface characteristic of said converging means;

allowing said dispersed beam of light to pass only through a plurality of polarization analyzer means, each having a linear axis associated therewith, disposed on said focal surface in different regions of said dispersed beam, each said analyzer means having a different orientation with respect to said beam of polarized white light;

analyzing the polarization of said dispersed beam of spatially-modulated light with said plurality of polarization analyzer means to form a polarization-analyzed beam carrying a pseudocolored version of said image; and filtering out of first, second, and third portions of said polarization-analyzed beam all spectral colors except a remaining plurality of colors to produce an output beam carrying said image density-encoded in pseudocolor.

27. A method for pseudocolor density encoding of an image, comprising:

providing a beam of linearly polarized white light with an axis of linear polarization;

encoding said beam with said image by spatially modulating said polarized white light beam by spatially altering the polarization in accordance with the spatial distribution of intensities in said image with a spatial light polarization modulation (SLPM) means disposed in a path of said light beam;

dispersing said spatially modulated white light beam with a light dispersion means disposed in a path of said beam following said SLPM means into a dispersed beam with spatially separated component colors;

converging a spatially modulated beam from said SLPM means with a light converging means onto a focal surface thereof to produce a converged spatially modulated beam;

analyzing a first portion of light in said converged spatially modulated beam incident on a first polarization analyzer means disposed in said back focal plane;

analyzing a second portion of light in said converged spatially modulated beam incident on a second polarization analyzer means disposed in said back focal plane;

analyzing a third portion of light in said converged spatially modulated beam incident on a third polarization analyzer means disposed in said back focal plane;

blocking those portions of said dispersed beam not passing through said first, second, and third analyzer means with a masking means; and superposing said first, second, and third portions of said dispersed beam on a screen to form an enlarged pseudocolored version of said image.

28. The method of claim 27 further comprising;

filtering out all spectral colors except a first color from said first portion of light with a first color filtering means disposed in a path of said dispersed beam after said first polarization analyzer means to produce a first portion of an output beam;

filtering out all spectral colors except a second color from said first portion of light with a second color filtering means disposed in a path of said dispersed beam after said second polarization analyzer means to produce a second portion of an output beam;

filtering out all spectral colors except a third color from said third portion of light with a third color filtering means disposed in a path of said dispersed beam after said third polarization analyzer means to produce a third portion of an output beam; and superposing said first, second, and third portions of said output beam to produce an output beam carrying said image density-encoded in pseudocolor.

* * * * *

UNITED STATES PATENT AND TRADEMARK OFFICE
CERTIFICATE OF CORRECTION

PATENT NO. : 5,019,898

DATED : May 28, 1991

INVENTOR(S) : Tien-Hsin Chao, et al

It is certified that error appears in the above-identified patent and that said Letters Patent is hereby corrected as shown below:

Column 1, line 33: "substracts" should be --subtracts--.

Column 8, line 3: "proportionally" should be --proportionality--.

Column 11, line 33: "claim 1" should be --claim 12--.

Signed and Sealed this

Fifth Day of January, 1993

*Attest:*

DOUGLAS B. COMER

*Attesting Officer*  Acting Commissioner of Patents and Trademarks